(12) United States Patent
Allen et al.

(10) Patent No.: US 9,808,389 B2
(45) Date of Patent: Nov. 7, 2017

(54) SCENT HOLDER

(71) Applicants: Shannon R Allen, Flower Mound, TX (US); Magdiel I Allen, Flower Mound, TX (US)

(72) Inventors: Shannon R Allen, Flower Mound, TX (US); Magdiel I Allen, Flower Mound, TX (US)

( * ) Notice: Subject to any disclaimer, the term of this patent is extended or adjusted under 35 U.S.C. 154(b) by 0 days.

(21) Appl. No.: 14/832,940

(22) Filed: Aug. 21, 2015

(65) Prior Publication Data
US 2017/0049652 A1 Feb. 23, 2017

(51) Int. Cl.
| | | |
|---|---|---|
| *A47G 25/60* | (2006.01) | |
| *A61G 13/10* | (2006.01) | |
| *F16M 13/02* | (2006.01) | |
| *F16M 11/04* | (2006.01) | |
| *A47G 29/08* | (2006.01) | |

(52) U.S. Cl.
CPC ........... *A61G 13/10* (2013.01); *F16M 11/046* (2013.01); *F16M 13/022* (2013.01); *A47G 25/60* (2013.01); *A47G 29/083* (2013.01)

(58) Field of Classification Search
USPC ... 248/309.1, 310, 316.1, 316.4, 316.8, 690, 248/227.1, 304, 307, 339, 27.8; 211/85.12, 175, 119.004; 47/41.01, 47/41.11, 44.47
See application file for complete search history.

(56) References Cited

U.S. PATENT DOCUMENTS

| | | | | |
|---|---|---|---|---|
| 4,949,924 A | * | 8/1990 | Carmody | A47H 27/00 248/215 |
| 5,368,267 A | * | 11/1994 | Howard | A47G 7/044 248/208 |
| 5,487,517 A | * | 1/1996 | Smith | A47G 7/045 248/215 |
| 5,664,367 A | * | 9/1997 | Huang | A47G 7/044 248/311.2 |
| 5,870,856 A | * | 2/1999 | Friend | A01G 9/02 47/65.7 |
| 5,873,555 A | * | 2/1999 | Crace | A47G 7/044 248/215 |
| 7,793,905 B2 | * | 9/2010 | Merritt | A47G 23/0225 248/311.2 |
| 2005/0211861 A1 | * | 9/2005 | Lee | F16M 13/02 248/309.1 |
| 2006/0169859 A1 | * | 8/2006 | Ploeger | B25H 3/06 248/309.1 |
| 2007/0094928 A1 | * | 5/2007 | Hunter | A01G 27/04 47/79 |
| 2007/0227067 A1 | * | 10/2007 | Sieverding | A01G 9/021 47/65.5 |

* cited by examiner

*Primary Examiner* — Alfred Wujciak
(74) *Attorney, Agent, or Firm* — Braxton, Hilton & Perrone, PLLC (57) ABSTRACT

A system for a scent mount. The scent mount has a table mount which couples to a table, such as a massage table. The table mount is coupled to a vertical coupler which has a horizontal portion and a vertical portion. The vertical portion of the vertical coupler is further coupled to a scent coupler. The scent coupler is coupled to a scent mount. The scent mount can house scents such as oils. The scent mount can be adjusted in many directions to position the scent mount in any desired location for optimal efficacy.

18 Claims, 5 Drawing Sheets

SCENT HOLDER

BACKGROUND OF THE INVENTION

Technical Field

The present invention relates to a system and method for coupling and using a scent holder.

Description of Related Art

Scented materials, such as aromas, can provide many benefits including increased relaxation. Sometimes it may be beneficial to supply a scent or aroma in close proximity to a person to increase the efficiency of the scented material or aroma. Consequently, it is desirable to have a scent holder which can deliver a desired aroma in a desired location.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
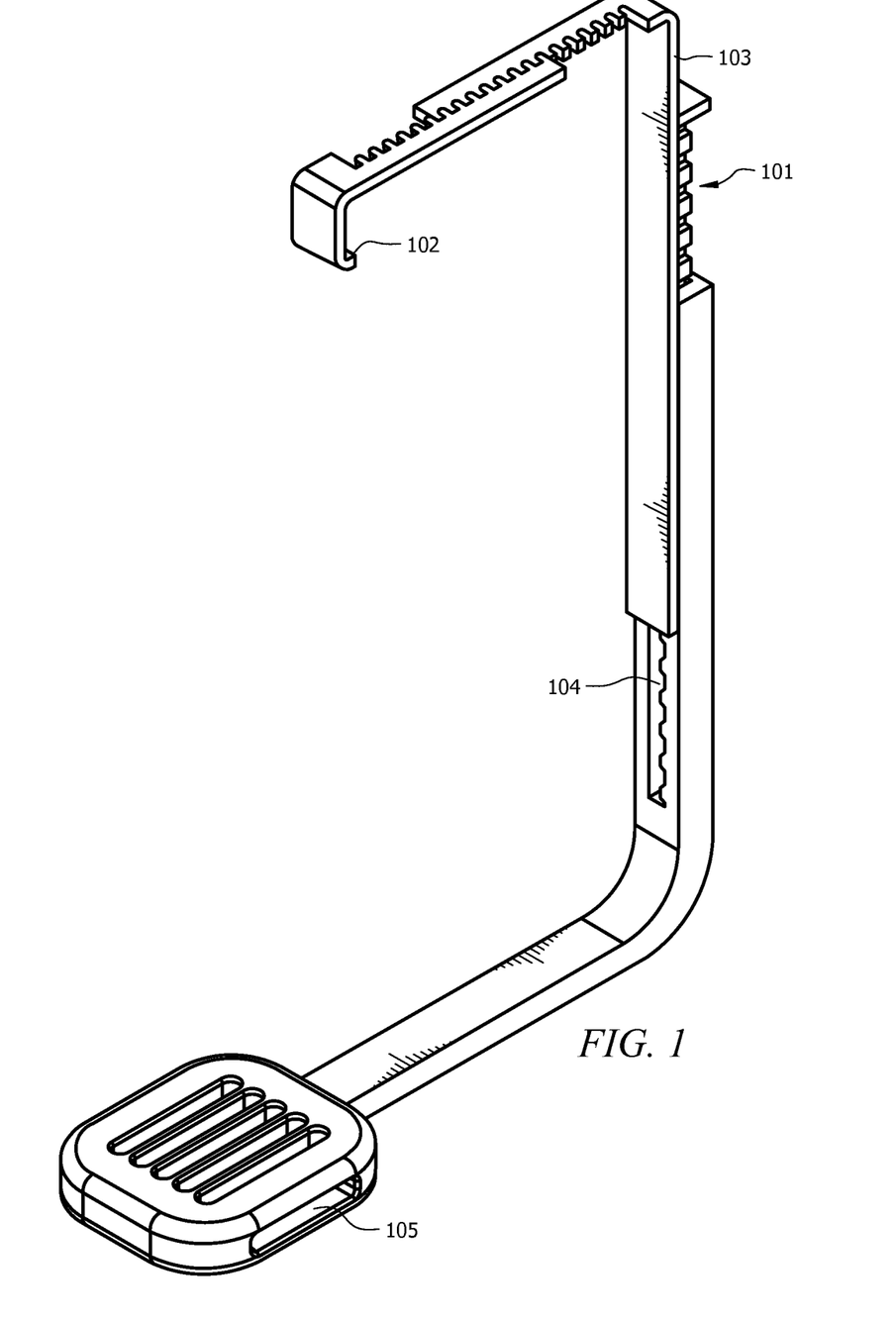
FIG. 1 is a perspective view of the scent holder in one embodiment.
Figure 2:
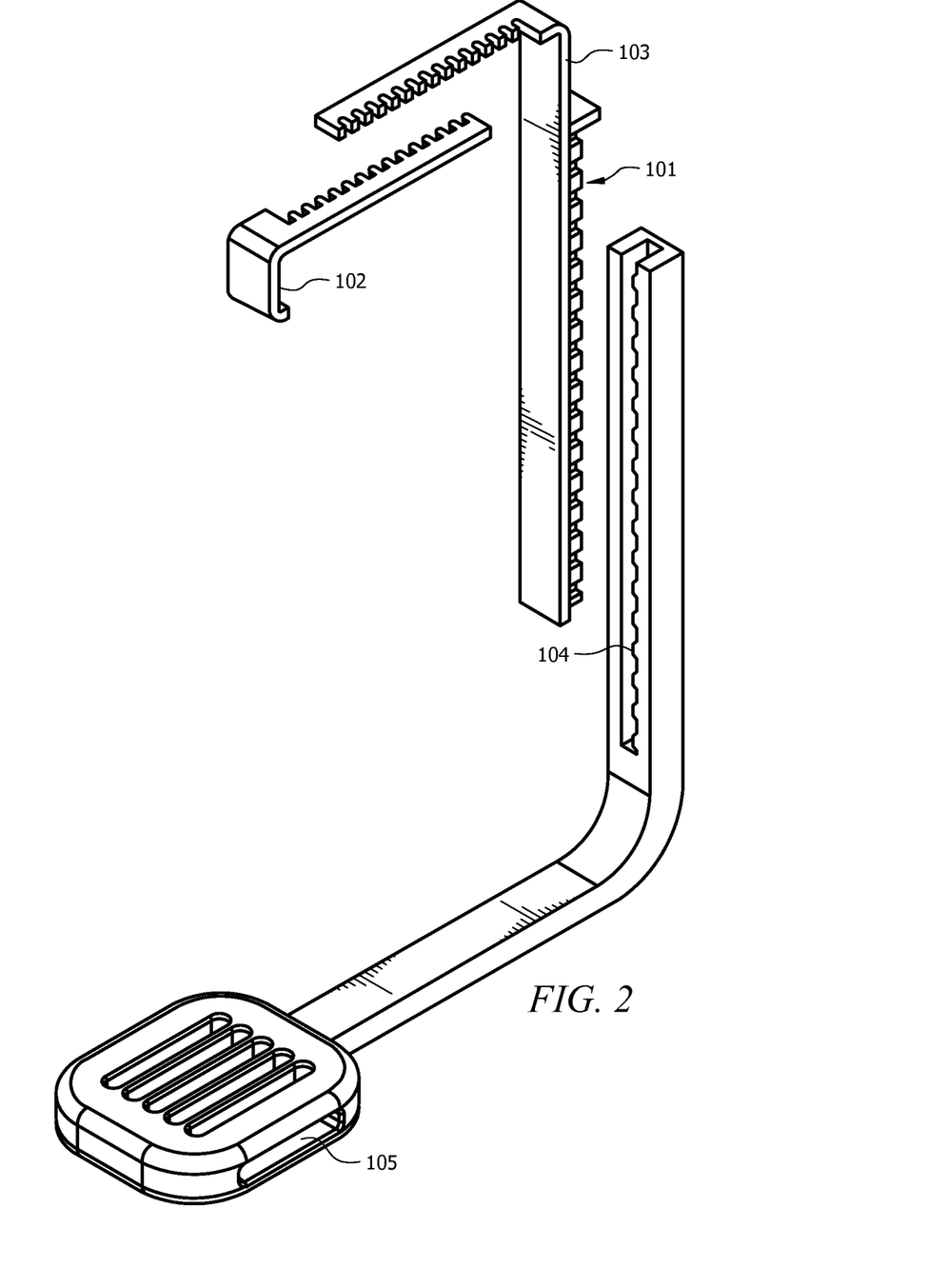
FIG. 2 is an exploded view of the scent holder in one embodiment.

FIG. 1 is a perspective view of the scent holder in one embodiment. FIG. 2 is an exploded view of the scent holder in one embodiment. A scent holder 101 is an object which can be mounted and manipulated to position a scent mount in a desired location. The scent holder can be mounted to any object including a wall, a table, a desk, a counter, and others. In one embodiment the scent holder 101 is secured to a massage table. While a massage table is discussed in one embodiment, this is for illustrative purposes only and should not be deemed limiting. Often when getting a massage, scent materials, such as scented oils, are used to help during the massage. The scents can be used to enhance relaxation, enhance enjoyment, and for various other purposes. The scent materials can include scented oils, aroma therapy, and others. In one embodiment essential oils which are common to a massage therapist can be used. These can include, but are not limited to Peppermint (*Mentha piperita*), Tea Tree (*Melaleuca alternifolia*), Eucalyptus (*Eucalyptus globulus*), Lavender (*Lavandula angustifolia*), Neroli (*Citrus aurantium* var *amara*), Roman chamomile (*Chamaemelum nobile*), Lemon (*Citrus limon*), Geranium (*Pelargonium graveolens*), Ylang-Ylang (*Cananga odorata*), and Palmarosa (*Cymbopogon martinii*).

In one embodiment, it is desirable to place the scented material for maximum effect in a place approximate to the user's face. Accordingly, in one embodiment, the scent holder is positioned to be below a user's exposed face when the user is face down in a massage table.

Often a massage table has a U-shaped portion into which a user can place his or her face during a massage. In one embodiment, the scent holder is positioned such that the scented material can be positioned below and adjacent to the user's face when lying face-down on a massage table. Accordingly, in one embodiment, the scent holder is coupled to the massage table.

Turning back to FIG. 1, the table mount 102 is depicted. A table mount 102, as used herein, refers to a mounting device which mounts the scent holder 101 to an object. While referred to herein as a table mount 101, the table mount 101 can mount to more than just a table. It can mount to any object previously described.

The table mount 102 as depicted comprises a mount portion which allows it to engage the table or other object. The mount portion can comprise any method or device to couple, either directly or indirectly, a scent holder 101 to an object. As depicted, the mount portion comprises a lip and a curved portion. The lip and curved portion couples to a table by friction, gripping the table and securing the scent holder 101 to the object. The size of the lip portion can be adjusted to match the size of the table or other object. For example, if the table is one inch in thickness, in one embodiment, the lip has a size of approximately one inch.

To secure the lip portion, the lip portion simply slides over the thickness of the table to engage the table. Likewise, to remove the lip portion, the lip portion is disengaged and removed from the table or other object. While a releaseable mount portion has been described, this is for illustrative purposes only and should not be deemed limiting. In other embodiments other attaching devices are used such that the table mount 102 is not readily releasable. Such attaching devices include more permanent devices such as screws, nails, bolts, or the like. As noted, virtually any traditional mounting device which mounts one object to another object can be utilized.

The table mount 102 further comprises an elongated attaching member which is used to attach the table mount 102 to the vertical coupler 103. The size and length of the table mount 102 can be varied for various embodiments. In one embodiment, the table mount 102 has dimensions of between about 2 to about 8 inches. In one embodiment, the table mount 102 has dimensions of about 3.5 inches.

As noted, the table mount 102 is depicted as being coupled to the vertical coupler 103. The vertical coupler 103, in one embodiment, couples the table mount 102 to the scent coupler 104, discussed in more detail below. The vertical coupler 103 allows for increased adjustment. As seen in FIG. 1, and discussed in more detail below, the vertical coupler 103 allows the placement of the scent mount 105 to be adjusted in the horizontal direction by adjusting the vertical coupler 103 horizontally relative to the table mount 102. Further, the vertical coupler 103 allows the placement of the scent mount 105 to be adjusted in the vertical direction by adjusting the vertical coupler 103 vertically relative to the scent coupler 104. Accordingly, in one embodiment, the vertical coupler 103 allows for positioning of the scent mount 105 to be controlled in at least two dimensions.

As depicted, the vertical coupler 103 comprises an L-shaped member. The L-shaped member comprises a horizontal portion which couples to the table mount 102 and a vertical portion which couples to the scent coupler 104. The dimensions of the vertical coupler 103 can be adjusted to virtually any desirable dimension. In one embodiment the vertical coupler 103 has a length of about 2 to about 8 inches and a width of between about 1 and 3 inches.

While the vertical coupler 103 is depicted as being an L-shape, this is for illustrative purposes only and should not be deemed limiting. For example, in other embodiments the vertical coupler 103 is curved or rounded. Further, while the horizontal portion and the vertical portion of the vertical coupler 103 are depicted as intersecting at a right angle, this is for illustrative purposes only. In other embodiments the vertical portion interests the horizontal portion at an angle greater than 90 degrees, whereas in other embodiments the vertical portion intersects at an angle less than 90 degrees. In another embodiment, the vertical and horizontal portions are coupled via an adjustable hinge whereby the angle can be adjusted. Adjusting the angle of intersection allows for further placement and refinement of the placement of the scent mount 105.

As noted, coupled to the vertical portion of the vertical coupler 103 is the scent coupler 104. The scent coupler 104, in one embodiment, has a horizontal portion and a vertical portion. Like the vertical coupler 103, in one embodiment the intersection between the horizontal portion and the vertical portion can be 90 degrees, greater than 90 degrees, or less than 90 degrees. In still other embodiments, there is an adjustable hinge allowing this angle to be adjusted.

The scent coupler 104 can have various dimensions. In one embodiment the scent coupler 104 has a length of between about 3 to about 7 inches and a width of between about 2 to about 9 inches.

As depicted, and in one embodiment, the vertical portion of the scent coupler 104 couples with the vertical portion of the vertical coupler 103. The horizontal portion of the scent coupler 104 couples to the scent mount 105.

The horizontal portion of the scent coupler 104 can couple to the scent mount 105 via any method or device known in the art. In one embodiment the scent coupler 104 and the scent mount are integrally made as a single piece. In other embodiments the scent mount 105 clips, screws, or otherwise attaches to the scent coupler 104.

Figure 3:
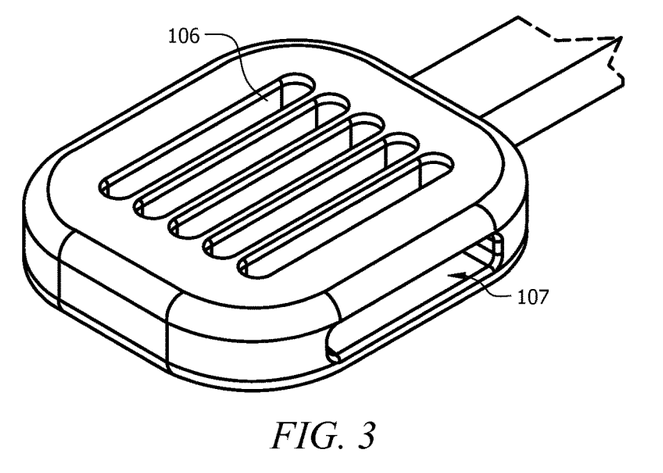
FIG. 3 is a perspective view of the scent mount in one embodiment.

FIG. 3 is a perspective view of the scent mount in one embodiment. A scent mount, as used herein, refers to a mount which is used to hold a desired amount of a scented material. A scented material, as used herein, refers to a material which is used because it releases a specific scent. The scented material can take many forms including powders, liquids, oils, gels, etc. The scented material can be a stand-alone scent, such as an oil in a pan, or the scent can be applied to another carrier, such as applying an oil to a cotton swab. In one embodiment the scented material is heat activated, whereas in other embodiments the scented material requires no external heat.

The scent mount 105 can comprise any container which houses a scented material. As noted, the scented material utilized can comprise a liquid, solid, or powder form, or it can be applied to a carrier. Thus, in some embodiments, the scent mount 105 comprises a container which houses a scented material. In one embodiment, the scent mount 105 comprises a pan into which a scented material can be placed or poured. In other embodiments, however, the scented material is not placed directly onto the scent mount 105 but instead, the scented material is located on a container or dispenser which is inserted into the scent mount 105. Such an embodiment is depicted in FIG. 3.

FIG. 3 depicts a scent mount 105 with scent openings 106 and a receiving slot 107 to accept a scented material. In one embodiment, the receiving slot 107 is sized so as to receive a pan or other container which holds a scented material. In one embodiment, a scented material is loaded into a pan either directly or through a carrier as discussed above. Thereafter, the pan is placed through the receiving slot 107. In still other embodiments, however, the pan is already pre-loaded with a scented material. In such a case, the pre-loaded pan is simply placed through the receiving slot 107.

The scent mount 105 can have various dimensions. In one embodiment the scent mount 105 has a length of between about 1 inches to about 3 inches. The scent mount 105 has a height of between about 0.2 inches to about 0.5 inches. The scent mount 105 in FIG. 3 further has a plurality of scent openings 106. These are holes or gaps located at the top of the scent mount 105 which allow the scent to escape. In some embodiments, however, the scent mount 105 does not have a top.

The scent openings 106, in one embodiment, are maximized to increase the exposed surface area of the scented material and therefore aid in the scent diffusing. In one embodiment, which is not depicted, the scent openings 106 comprise guides or channels which direct the direction of the scent. In one such embodiment, the guides can be pointed and adjusted to direct the flow of the scent in a desired location.

The coupling of the various pieces in one embodiment will now be described. The various pieces can be coupled via any method or device known in the art. However, in one embodiment, teeth and groves are utilized.

Figure 4:
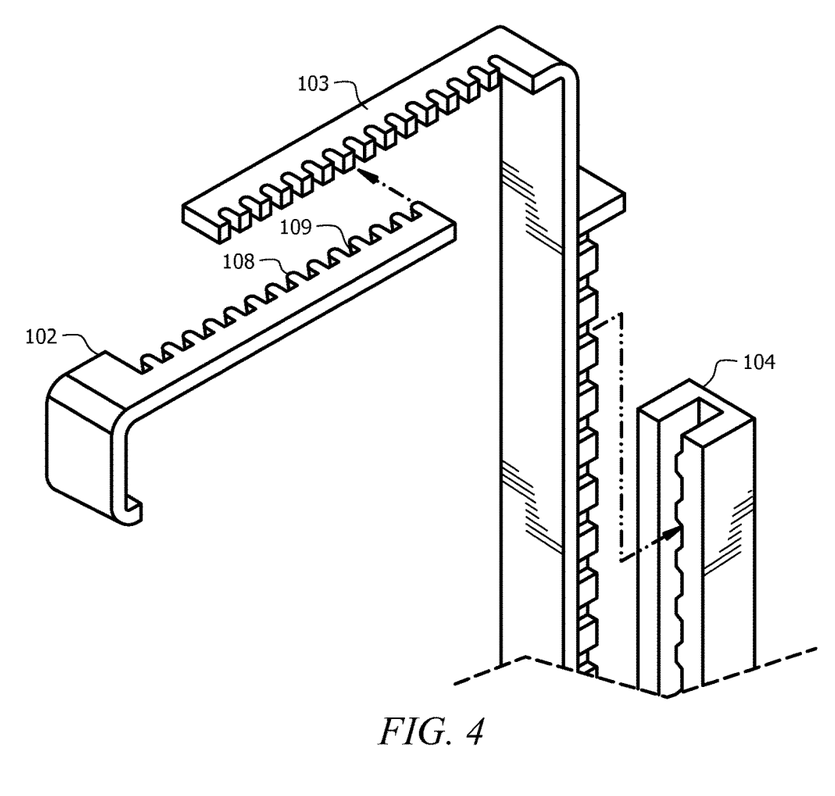
FIG. 4 is an exploded view of the table mount and the vertical coupler in one embodiment.
Figure 5:
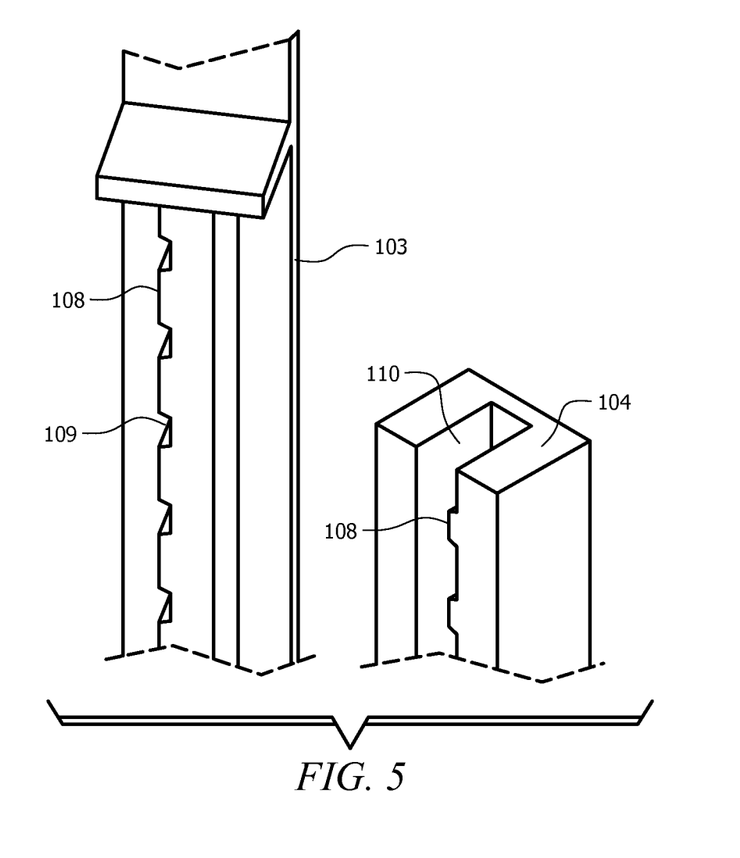
FIG. 5 is an exploded review of the vertical coupler and the scent coupler in one embodiment.

FIG. 4 is an exploded view of the table mount and the vertical coupler in one embodiment. FIG. 5 is an exploded review of the vertical coupler and the scent coupler in one embodiment. In both of these figures teeth 108 and groves 109 are used to couple two pieces to one another.

Turning to FIG. 4, the table mount 102 has a plurality of teeth 108 which protrude outwardly from the surface. Further, the table mount 102 has a plurality of grooves 109 which are voids cutting inwardly from the surface. In one embodiment, and as depicted, the teeth 108 of the table mount 102 are received by the matching grooves 109 of the vertical coupler 103. Simultaneously, the teeth 108 of the vertical coupler 103 are received by the matching grooves 109 of the table mount 102. In this fashion, the table mount 102 can be releaseably coupled to the vertical coupler 103.

As can be seen, in some embodiments the table mount 102 and/or the vertical coupler 103 each comprise a plurality of teeth 108 and grooves 109. This feature allows the vertical coupler 103 to be horizontally adjustable relative to the table mount 102. If the table mount 102 needs to be extended outwardly relative to the vertical coupler 103, the two are decoupled, the table mount 102 is moved horizontally into the desired location, and the two pieces are once again coupled. The spacing of the teeth and grooves along the length of each piece provides for this adjustability.

In some embodiments, the friction and tightness of the grooves 109 and the teeth 108 provide sufficient adherence to maintain the two pieces in a coupled arrangement. However, in other embodiments a separate additional force is utilized to secure the pieces in a coupled arrangement. This additional force can comprise a snap, brace, band, bracket, or the like, which serves to further secure the two pieces in a coupled arrangement. In one embodiment, and as depicted, the teeth and groove are oriented on the horizontal axis.

Similar to the teeth and grooves of FIG. 4, the teeth 108 and grooves 109 of the vertical coupler 103 coordinate and match with the teeth 108 and grooves 109 of the scent coupler 104. As can be seen in FIGS. 2 and 5, the vertical coupler has spaced apart teeth 108 which are separated by grooves 109. As depicted, and in one embodiment, the teeth 108 comprise a more square and rigid cross-section than the teeth 108 depicted in the table mount 102. In one embodiment, the set of teeth 108 located on the vertical coupler 103 which engage the scent coupler 104 are offset by approximately 90 degrees than the teeth 108 located on the vertical coupler 103 which engage the table mount 102.

In one embodiment, and as depicted, the scent coupler 104 comprises a recess 110 which houses the teeth 108 and grooves 109. This is best depicted in FIG. 5. As depicted, the scent coupler 104 comprises a U-shaped cross-section with the recess 110 extending for a substantial portion of its length.

In one embodiment, and as depicted, the teeth 108 and grooves 109 located on the vertical coupler 103 portion which couples to the scent coupler 104 are located on a raised portion which extends from the planar face of the vertical coupler 103. This raised portion, in one embodiment, is received by the recess 110 located in the scent coupler 104. By fitting the raised portion in the recess 110, the stability of the scent coupler 104 relative to the vertical coupler 103 is increased. Further, the teeth 108 and grooves 109 of each piece ensures each piece is locked in a coupled arrangement. As discussed previously, if it is desired to adjust the scent coupler 104 downward vertically relative to the vertical coupler 103, the two pieces are disengaged, the scent coupler 104 is lowered downwardly, and the two pieces are re-coupled in the desired location. In this fashion, it can be seen how the scent mount 105 can be adjusted in at least two dimensions relative to a fixed point. In further embodiments, one or more of the pieces can further comprise a hinge or pivot about which the pieces can rotate. In such embodiments the ability to position the scent mount 105 is increased further.

It can be appreciated that a scent holder 101 has been described wherein the scent mount 105 can be adjusted in at least two dimensions relative to an object. In one embodiment, the scent mount 105 can be coupled to a table, such as a massage table. The scent mount 105 can be then filled with a scented material such as aroma therapy oils. The scent mount 105 can then be adjusted as desired to position the scented material at an optimal distance and location to increase the efficacy of the scented material. Given the adjustability of the scent holder 101, in one embodiment, the scent holder 101 can be adjusted for a variety of tables, sizes, dimensions, and locations.

Figure 6:
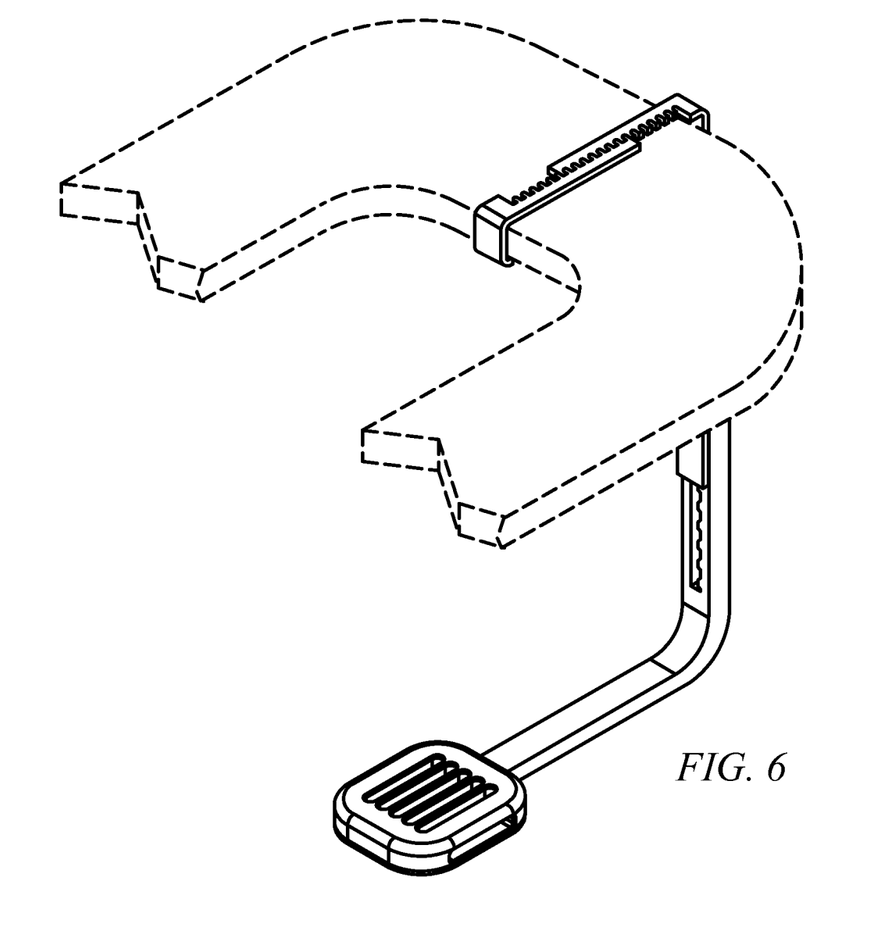
FIG. 6 is a perspective view of the scent mount mounted to a massage table in one embodiment.

FIG. 6 is a perspective view of the scent mount mounted to a massage table in one embodiment. As can be seen, the scent can be advantageously positioned below the user's face when the user is lying face-down on the massage table. It can be seen how the table mount 102 secures to the table as well as how the vertical coupler 101 and the scent coupler 104 can be adjusted to effectively place the scent mount 105 in the desired location.

The scent holder 101 discussed above can comprise virtually any material. These materials include plastics, rubbers, wood, metal, polymers, and combinations thereof.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A scent holder comprising:
- a table mount;
- a vertical coupler comprising a horizontal portion and a vertical portion, wherein said horizontal portion of the vertical coupler is coupled to the table mount;
- a scent coupler comprising a horizontal portion and a vertical portion, wherein the vertical portion of the scent coupler is coupled to the vertical portion of the vertical coupler;
- a scent mount for housing a scent, wherein said scent mount is coupled to the horizontal portion of the scent coupler.

Clause 2. The scent holder of any proceeding or preceding claim wherein the table mount comprises a mount portion and an elongated attaching member, and wherein the horizontal portion of the vertical coupler is coupled to the elongated attaching member of the table mount.

Clause 3. The scent holder of any proceeding or preceding claim wherein the table mount is adjustable horizontally relative to the vertical coupler.

Clause 4. The scent holder of any proceeding or preceding claim wherein the vertical coupler is adjustable vertically relative to the scent coupler.

Clause 5. The scent holder of any proceeding or preceding claim 1 wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler.

Clause 6. The scent holder of any proceeding or preceding claim wherein the vertical portion of the vertical coupler comprises a plurality of teeth and grooves, and wherein the vertical portion of the scent coupler comprises a plurality of teeth and grooves, and wherein the teeth and grooves of the vertical portion of the vertical coupler mate with the teeth and grooves of the vertical portion of the scent mount.

Clause 7. The scent holder of any proceeding or preceding claim wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler, and wherein the teeth and grooves of the vertical portion of the vertical coupler are offset by approximately 90 degrees from the teeth and grooves of the horizontal portion of the vertical coupler.

Clause 8. The scent holder of any proceeding or preceding claim wherein said scent coupler comprises a U-shaped cross section along its length where the teeth and grooves are located providing a recess.

Clause 9. The scent holder of any proceeding or preceding claim wherein the teeth and grooves on the vertical portion of the vertical coupler are located on a raised portion which extends from the planar face of the vertical coupler, and wherein said raised portion is received by the recess of the scent coupler.

Clause 10. The scent holder of any proceeding or preceding claim wherein the vertical portion of the scent coupler comprises an elongated vertical recess for receiving a portion of the vertical portion of the vertical coupler.

Clause 11. The scent holder of any proceeding or preceding claim wherein the scent mount comprises scent openings located on a top side of the scent mount.

Clause 12. The scent holder of any proceeding or preceding claim wherein the scent mount comprises a receiving slot.

Clause 13. The scent holder of any proceeding or preceding claim wherein a pan is inserted through a receiving slot, wherein said pan is configured to hold a liquid.

Clause 14. A scent holder comprising:
  a table mount comprising an elongated portion and a mount portion for securing to an object;
  a vertical coupler comprising a horizontal portion and a vertical portion, wherein said horizontal portion of the vertical coupler is coupled to the elongated portion of the table mount;
  a scent coupler comprising a horizontal portion and a vertical portion, wherein the vertical portion of the scent coupler is coupled to the vertical portion of the vertical coupler;
  a scent mount for housing a scent, wherein said scent mount comprises a receiving slot and scent openings located atop said scent mount, wherein said scent mount is coupled to the horizontal portion of the scent coupler;
  wherein the table mount is adjustable horizontally relative to the vertical coupler;
  and wherein the vertical coupler is adjustable vertically relative to the scent coupler.

Clause 15. The scent holder of any proceeding or preceding claim wherein the table mount, the vertical coupler, and the scent coupler are coupled together to position the scent mount in a desired location under a massage table.

Clause 16. The scent holder of any proceeding or preceding claim wherein the scent mount is positioned beneath a U-shaped void in a massage table.

Clause 17. The scent holder of any proceeding or preceding claim wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler, and wherein the vertical portion of the vertical coupler comprises a plurality of teeth and grooves, and wherein the vertical portion of the scent coupler comprises a plurality of teeth and grooves, and wherein the teeth and grooves of the vertical portion of the vertical coupler mate with the teeth and grooves of the vertical portion of the scent mount.

Clause 18. The scent holder of any proceeding or preceding claim wherein said scent mount comprises a scented material.

Clause 19. The scent holder of any proceeding or preceding claim wherein said scent holder does not require external heat.

Clause 20. The scent holder of any proceeding or preceding claim wherein said scent holder does not comprise any moving parts.

What is claimed is:

1. A scent holder comprising:
  a table mount;
  a vertical coupler comprising a horizontal portion and a vertical portion, wherein said horizontal portion of the vertical coupler is coupled to the table mount;
  a scent coupler comprising a horizontal portion and a vertical portion, wherein the vertical portion of the scent coupler is coupled to the vertical portion of the vertical coupler;
  a scent mount for housing a scent, wherein said scent mount is coupled to the horizontal portion of the scent coupler; and
  wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler; and wherein the vertical coupler is adjustable vertically relative to the scent coupler.

2. The scent holder of claim 1 wherein the table mount comprises a mount portion and an elongated attaching member, and wherein the horizontal portion of the vertical coupler is coupled to the elongated attaching member of the table mount.

3. The scent holder of claim 1 wherein the table mount is adjustable horizontally relative to the vertical coupler.

4. The scent holder of claim 1 wherein the vertical portion of the scent coupler comprises an elongated vertical recess for receiving a portion of the vertical portion of the vertical coupler.

5. The scent holder of claim 1 wherein the scent mount comprises scent openings located on a top side of the scent mount.

6. The scent holder of claim 1 wherein the scent mount comprises a receiving slot, wherein said receiving slot is located on said scent mount.

7. The scent holder of claim 1 wherein a pan is inserted through a receiving slot, wherein said pan is configured to hold a liquid, wherein said receiving slot is located on said scent mount.

8. A scent holder comprising:
  a table mount;
  a vertical coupler comprising a horizontal portion and a vertical portion, wherein said horizontal portion of the vertical coupler is coupled to the table mount;
  a scent coupler comprising a horizontal portion and a vertical portion, wherein the vertical portion of the scent coupler is coupled to the vertical portion of the vertical coupler;
  a scent mount for housing a scent, wherein said scent mount is coupled to the horizontal portion of the scent coupler; and
  wherein the vertical portion of the vertical coupler comprises a plurality of teeth and grooves, and wherein the vertical portion of the scent coupler comprises a plurality of teeth and grooves, and wherein the teeth and grooves of the vertical portion of the vertical coupler mate with the teeth and grooves of the vertical portion of the scent mount.

9. The scent holder of claim 8 wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler, and wherein the teeth and grooves of the vertical portion of the vertical coupler are offset by approximately 90 degrees from the teeth and grooves of the horizontal portion of the vertical coupler.

10. The scent holder of claim 8 wherein said scent coupler comprises a U-shaped cross section along its length where the teeth and grooves are located providing a recess.

11. The scent holder of claim 10 wherein the teeth and grooves on the vertical portion of the vertical coupler are located on a raised portion which extends from the planar face of the vertical coupler, and wherein said raised portion is received by the recess of the scent coupler.

12. A scent holder comprising:
- a table mount comprising an elongated portion and a mount portion for securing to an object;
- a vertical coupler comprising a horizontal portion and a vertical portion, wherein said horizontal portion of the vertical coupler is coupled to the elongated portion of the table mount;
- a scent coupler comprising a horizontal portion and a vertical portion, wherein the vertical portion of the scent coupler is coupled to the vertical portion of the vertical coupler;
- a scent mount for housing a scent, wherein said scent mount comprises a receiving slot and scent openings located atop said scent mount, wherein said scent mount is coupled to the horizontal portion of the scent coupler;
- wherein the table mount is adjustable horizontally relative to the vertical coupler;
- and wherein the vertical coupler is adjustable vertically relative to the scent coupler.

13. The scent holder of claim 12 wherein the table mount, the vertical coupler, and the scent coupler are coupled together to position the scent mount in a desired location under a massage table.

14. The scent holder of claim 13 wherein the scent mount is positioned beneath a U-shaped void in a massage table.

15. The scent holder of claim 12 wherein said table mount comprises a plurality of teeth and grooves, and wherein the horizontal portion of the vertical coupler comprises a plurality of teeth and grooves, and wherein the teeth and grooves of the table mount mate with the teeth and grooves of the horizontal portion of the vertical coupler, and wherein the vertical portion of the vertical coupler comprises a plurality of teeth and grooves, and wherein the vertical portion of the scent coupler comprises a plurality of teeth and grooves, and wherein the teeth and grooves of the vertical portion of the vertical coupler mate with the teeth and grooves of the vertical portion of the scent mount.

16. The scent holder of claim 12 wherein said scent mount comprises a scented material.

17. The scent holder of claim 12 wherein said scent holder does not require external heat.

18. The scent holder of claim 12 wherein said scent holder does not comprise any moving parts.

\* \* \* \* \*